United States Patent
Lai

(10) Patent No.: US 6,204,477 B1
(45) Date of Patent: Mar. 20, 2001

(54) METHOD TO ELIMINATE WELD SOLIDIFICATION CRACKING OF 312 STAINLESS STEEL OVERLAY AND TO MINIMIZE THE OVERLAY'S THERMAL EXPANSION MISMATCH WITH CARBON STEEL OR LOW ALLOY STEEL SUBSTRATE

(75) Inventor: George Ying-Dean Lai, Carmel, IN (US)

(73) Assignee: WSI Welding Services, Inc., Norcross, GA (US)

( * ) Notice: Subject to any disclaimer, the term of this patent is extended or adjusted under 35 U.S.C. 154(b) by 0 days.

(21) Appl. No.: 09/002,119

(22) Filed: Dec. 31, 1997

(51) Int. Cl.⁷ ........................................... B23K 9/00
(52) U.S. Cl. ..................... 219/137 WM; 219/137 R; 219/136; 219/76.14; 219/74
(58) Field of Search .................. 219/137 WM, 219/137 R, 136, 146.1, 146.23, 76.1, 74, 76.14, 72; 228/214, 218, 219

(56) References Cited

U.S. PATENT DOCUMENTS

| | | | |
|---|---|---|---|
| 3,573,420 | * | 4/1971 | Johnson .................................. 219/76 |
| 3,626,138 | * | 12/1971 | Hurley .................................... 219/76 |
| 3,770,932 | * | 11/1973 | Cotter et al. ........................... 219/74 |
| 3,999,031 | * | 12/1976 | Yonezawa et al. ........... 219/121 EM |
| 4,000,373 | * | 12/1976 | Lula et al. ............................. 219/145 |
| 4,224,360 | * | 9/1980 | Ohnishi et al. ....................... 427/239 |
| 4,431,447 | * | 2/1984 | Schick ................................ 75/128 W |
| 4,609,577 | * | 9/1986 | Long ..................................... 428/683 |
| 4,624,406 | * | 11/1986 | Yasuda et al. .................. 228/263.15 |
| 5,306,358 | * | 4/1994 | Lai et al. ............................. 148/427 |
| 5,569,396 | * | 10/1996 | Topolski ............................. 219/76.14 |

FOREIGN PATENT DOCUMENTS

| | | | |
|---|---|---|---|
| 51012349 | * | 4/1977 | (JP) ............................. B23K/35/24 |
| 60133975 | * | 7/1985 | (JP) ............................. B23K/09/04 |

* cited by examiner

Primary Examiner—Patrick Ryan
Assistant Examiner—M. Alexandra Elve
(74) Attorney, Agent, or Firm—Pillsbury Madison & Sutro, LLP

(57) ABSTRACT

A method for applying a stainless steel weld overlay on a substrate, e.g., a carbon steel or low alloy steel, uses an arc welding process. The process includes welding a stainless steel weld overlay onto the substrate using a shielding gas mixture including greater than 2% nitrogen by volume with balance being an inert gas or a mixture of inert gases. The nitrogen is of a sufficient concentration so as to eliminate solidification cracking in the weld overlay. In addition, the nitrogen may help to eliminate a mismatch in me coefficient of thermal expansion between the weld overlay and the substrate. Furthermore, if the weld overlay comprises only a single layer, the nitrogen concentration in the shielding gas mixture may be less than 2%.

23 Claims, 2 Drawing Sheets

Mean coefficient of thermal expansion from room temperature to 800 F for the 312 stainless steel weld overlays as a function of nitrogen content (by volume percent) in Ar as a shielding gas mixture. Also indicated are the mean coefficients of thermal expansion for carbon steel and several low alloy steels (i.e., 1/2Cr-1/2Mo, 1Cr-1/2Mo and 2-1/4Cr-1/2Mo steels).

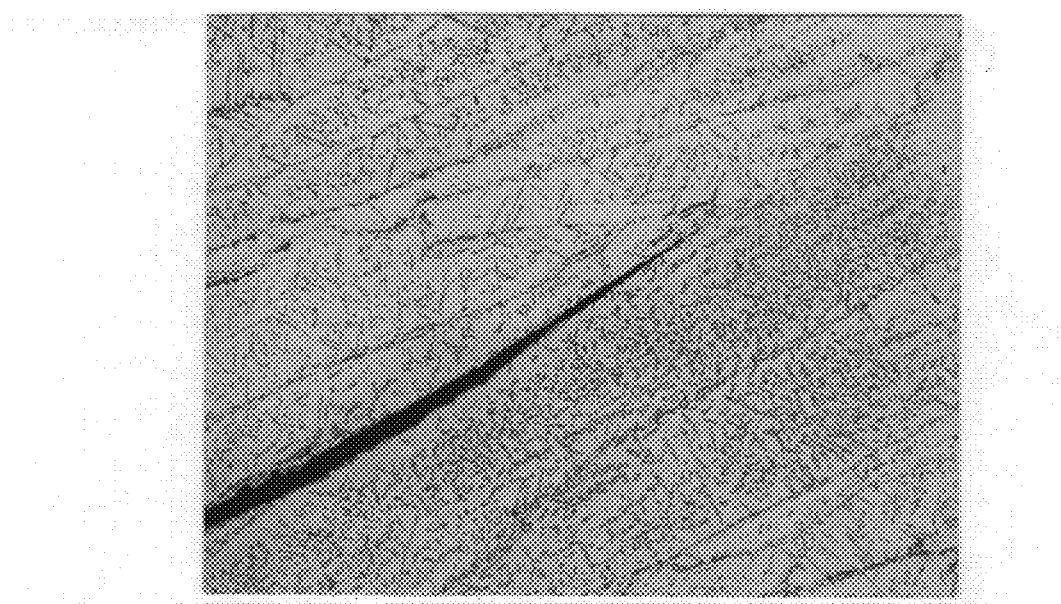
Figure 1(a)  Microstructure of 312 stainless steel weld overlay applied by a prior art with a shielding gas of Ar-2% $O_2$, showing weld solidification cracking. 100 X
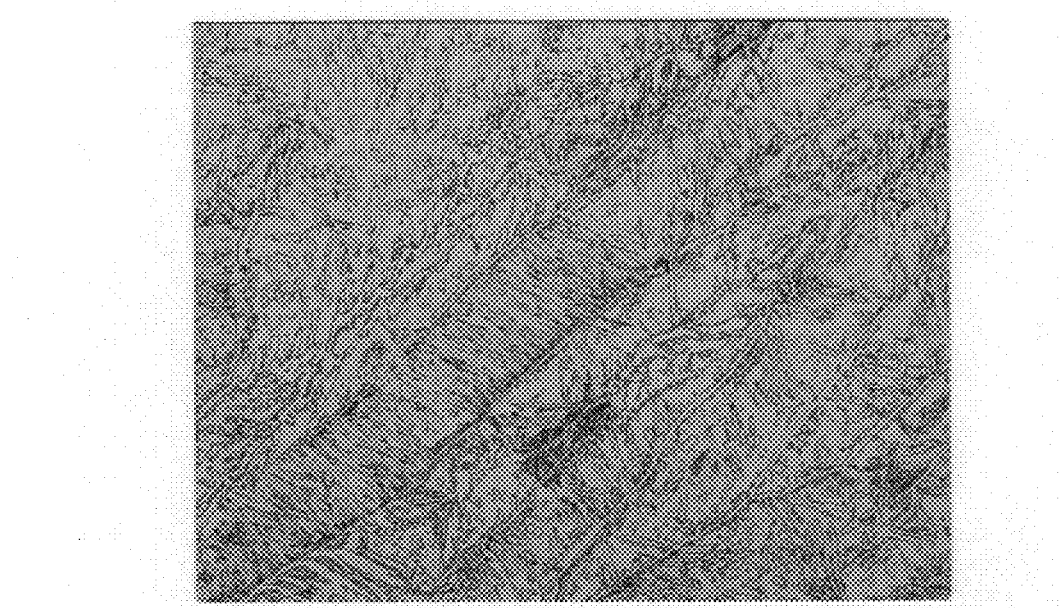
Figure 1(b)  Microstructure of 312 stainless steel weld overlay using the present invention of a shielding gas of Ar-5% $N_2$, showing no weld solidification cracking. 100 X

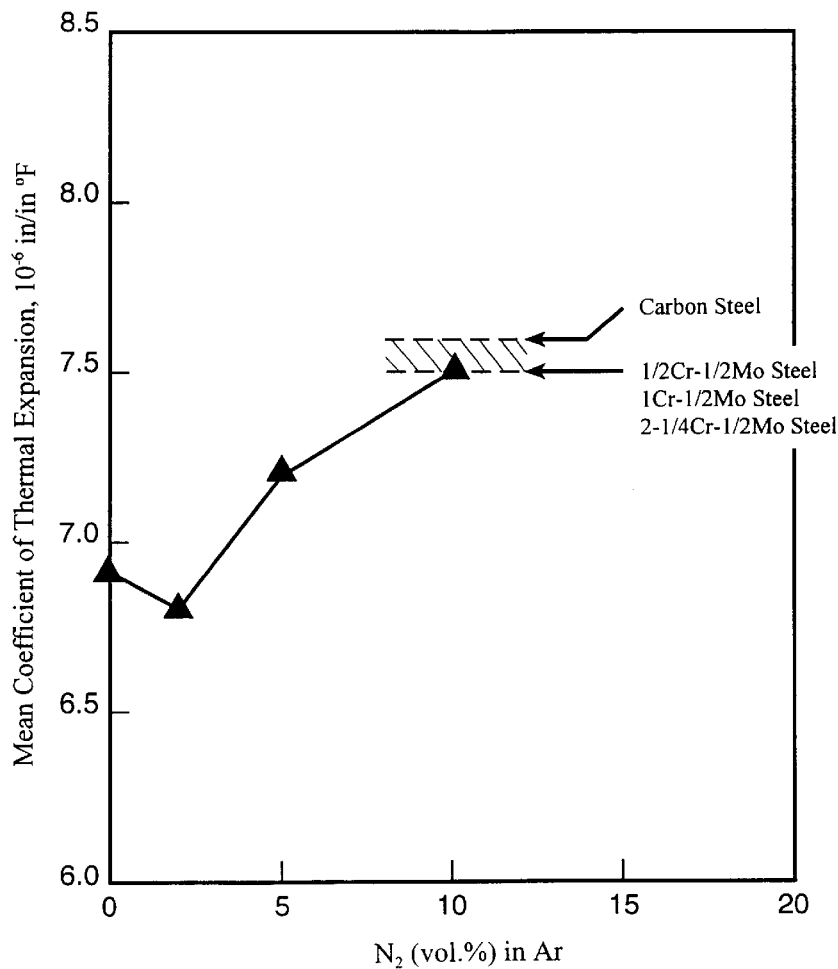
Figure 2   Mean coefficient of thermal expansion from room temperature to 800 F for the 312 stainless steel weld overlays as a function of nitrogen content (by volume percent) in Ar as a shielding gas mixture. Also indicated are the mean coefficients of thermal expansion for carbon steel and several low alloy steels (i.e., 1/2Cr-1/2Mo, 1Cr-1/2Mo and 2-1/4Cr-1/2Mo steels).

METHOD TO ELIMINATE WELD SOLIDIFICATION CRACKING OF 312 STAINLESS STEEL OVERLAY AND TO MINIMIZE THE OVERLAY'S THERMAL EXPANSION MISMATCH WITH CARBON STEEL OR LOW ALLOY STEEL SUBSTRATE

TECHNICAL FIELD OF INVENTION

This invention relates generally to weld overlay of 312 stainless steel on large industrial equipment, such as boiler tubes and processing vessels made of carbon steel or low alloy steel by an automatic welding machine with welding processes such as Gas Metal Arc Welding (GMAW) process using a special welding procedure. More specifically, it relates to the use of a critically controlled shielding gas mixture that eliminates solidification cracking in the weld overlay of 312 stainless steel or similar high chromium low nickel stainless steels that consist of mainly ferrite microstructure. Additionally, it relates to the use of this critically controlled shielding gas mixture to minimize or eliminate the thermal expansion mismatch between the 312 stainless steel weld overlay (or similar high chromium low nickel stainless steel overlay) and the carbon steel or low alloy steel substrate.

BACKGROUND OF THE INVENTION

Weld overlay using a corrosion-resistant alloy is widely used to protect boiler tubes and processing vessels made of carbon steel and low alloy steels against corrosion attack. In order to be cost effective and practical for application in large industrial equipment, weld overlay is typically applied by automatic weld overlay machines using a welding process that can deposit weld overlay at fast deposition rates, such as GMAW.

Austenitic stainless steels, such as 304, 316, 317, 309, 310, and the like, are most widely used as weld overlay alloys for the purpose of protecting carbon steel or low alloy steel boiler tubes as well as processing vessels against corrosion attack. These weld overlay alloys typically contain chromium concentrations of up to about 25%, by weight, and have been found to be successful in resisting corrosion attack in many industrial processes and systems. Because of the chromium content being not excessively high (i.e., 25% by weight or less), these filler metals are readily applied as a weld overlay to carbon steel or low alloy steel substrate with no serious solidification cracking problems. For some industrial environments, such as digesters, weld overlays made with these stainless steel filler metals having chromium concentrations of about 25%, by weight, or less may not be adequate to provide corrosion protection. It is well known that for most corrosion reactions, chromium is the most important alloying element that determines the alloy's corrosion resistance; the higher chromium in the alloy, the better corrosion resistance for the alloy. Thus, for more corrosive industrial environments, the use of 312 stainless steel filler metal containing 28–32% chromium, in weight, for the weld overlay may be required to provide adequate protection against corrosion attack. Because of extremely high chromium in 312 stainless steel filler metal and possibly ferrite-dominated microstructure in the weld metal, the 312 stainless steel weld overlay is extremely prone to weld solidification cracking. Thus, the use of 312 stainless steel filler metal was thought to be impossible for weld overlay of large industrial equipment such as boilers, processing vessels, digesters, etc., without the disadvantage of suffering weld solidification cracking.

For gas metal arc welding (GMAW), it is common practice for welding stainless steels with argon (Ar) as a shielding gas to protect weld pool from exposure to air atmosphere. It is also known the use of a shielding gas consisting of Ar and $O_2$ or $CO_2$ can sometimes stabilize the arc during welding. A stainless steel welding rods producer, Lincoln Electric, has discussed shielding gases for GMAW process in its publication "Stainless Steels Properties—How to Weld Them Where to Use Them" by John Gerken and Kamian Kotecki. The article indicates that 1–2% $O_2$ is generally added to argon for shielding gas to maintain arc stability when welding stainless steels. It further states that in the pulse spray mode of GMAW welding of stainless steels, argon or an argon-helium mixture with a small addition of oxygen or carbon dioxide is used. It is the practice of Welding Services Inc. for overlay welding of stainless steels using pulse spray mode in GMAW by using argon or argon with a small addition of $O_2$ or $CO_2$ as a shielding gas. Stainless steels that Welding Services Inc. has been successfully weld overlaid without cracking problems include austenitic stainless steels, such as 304, 309, 316, 317, and the like, martensitic and ferritic stainless steels, and duplex stainless steels, such as 2205. However, when weld overlay was made with 312 stainless steel filler metal using the aforementioned shielding gases, weld solidification cracking developed in the weld overlay.

Unexpectedly, it has been found that a weld overlay of 312 stainless steel can be made with GMAW processes without weld solidification cracking by using a specialty shielding gas mixture. This specialty shielding gas mixture consists of argon with nitrogen additions of more than 2% by volume. For multipasses (e.g.; three layers) of weld metal, weld solidification cracking was eliminated when the shielding gas mixture containing 5 to 20% $N_2$, in volume percent, and balance Ar was used. Additionally, it was discovered unexpectedly that the nitrogen-containing shielding gas can minimize the thermal expansion mismatch between the 312 stainless steel weld overlay and the carbon steel or low alloy steel substrate. The nitrogen content in the shielding gas mixture is preferably 10% (by volume) to significantly minimize or eliminate the 312 stainless steel overlay's thermal expansion mismatch with the substrate carbon steel or low alloy steels (e.g., 2¼Cr-½Mo, ½Cr-½Mo).

U.S. Pat. No. 5,306,358 relates to the use of an argon-nitrogen shielding gas mixture, with about 2 to 8% by volume, as a shielding gas for welding nickel-base superalloys containing boron and zirconium for reducing weld hot cracking problem. The patent's claims are specifically related to nickel base alloys containing boron and zirconium. There is no mentioning of stainless steels including 312 stainless steels in the patent. Stainless steels such as 312 stainless steel do not contain boron or zirconium. There is also no mention of welding a superalloy onto carbon steel or low alloy steel and its weld metal's thermal expansion coefficient mismatch with carbon steel or low alloy steel substrate.

U.S. Pat. No. 3,770,932 relates to the use of 309 stainless steel (comprised of about 25% Cr, 12% Ni, up to 0.06% C, up to 1.75% Mn, by weight, and the balance Fe with S, P, and Si impurities) and 310 stainless steel (about 28% Cr, 20% Ni, up to 0.08% C, up to 2.5% Mn, by weight and balance Fe with S, P, Si impurities) filler metals to weld 9 percent nickel steels and nitrogen stainless steels using a gas mixture containing nitrogen of about 10–14%. The main teaching of this patent is to use a nitrogen-containing shielding gas to increase the strength of 309 stainless steel or 310 stainless steel weld metal in order to match the strength of parent metal of 9 percent nickel steels and nitrogen stainless steels. When a shielding gas mixture containing less than 10% nitrogen is used, the weld metal using 309 stainless steel or 310 stainless steel filler metal does not have the required ultimate strength. There is no mentioning of weld metal cracking of stainless steels of 309 stainless steel or 310 stainless steel in the patent. There is also no mention of welding 309 stainless steel or 310 stainless steel onto carbon steel or low alloy steel, and its weld metal's thermal expansion mismatch with carbon steel or low alloy steel substrate.

The use of a nitrogen-containing shielding gas for welding 304 stainless steel and 316 stainless steel by gas tungsten arc welding (GTAW or commonly referred to as TIG) process was disclosed in an article "Influence of nitrogen addition on microstructure and pitting corrosion resistance of austenitic weld metals", published in Werkstoffe und Korrosion, vol. 37, page 637, 1986. The nitrogen-containing shielding gas resulted in the improvement in pitting resistance of stainless steel weld metals, such as, 304 stainless steel and 316 stainless steel, produced by TIG welding process. It is well known that nitrogen is beneficial in improving the stainless steel's pitting resistance in aqueous corrosive environments. Corrosion engineers in the chemical process industry frequently use a simple pitting index known as the "pitting resistance equivalent number" (PREN) to select a stainless steel or alloy with better pitting resistance. The PREN, which is equal to % Cr+3.3 (% Mo)+16 (% N), was discussed in a book titled "Corrosion of Stainless Steels" by A. John Sedriks, published by John Wiley & Sons, Inc., 1996. This formula indicates that the higher nitrogen content in the alloy, the higher PREN, and thus the higher pitting resistance for the alloy. A new class of stainless steels has been emerging in the industry and has been receiving wide application as materials of construction for equipment in chemical process and related industries. This new class of stainless steels are commonly referred to as "duplex stainless steels" which generally contain intentional additions of nitrogen in order to provide pitting corrosion resistance. Addition of nitrogen to the alloy, similar to additions of other alloying elements such as Cr, Mo, etc., is carried out during melting of the stainless steel.

For the weld overlay of a stainless steel on carbon steel or low alloy steel substrate, there generally exists a thermal expansion mismatch between the stainless steel overlay and the substrate steel. This thermal expansion mismatch can develop significant residual stresses that may pose potential for cracking of the weld overlaid component during service due to temperature cycling. It was unexpectedly discovered that the specialty shielding gas mixture of this invention results in increasing the coefficient of thermal expansion of the 312 stainless steel weld overlay as the nitrogen content increases, thus minimizing the overlay's thermal expansion mismatch with the carbon steel or low alloy steel substrate. The optimum level of nitrogen in the shielding gas mixture is about 10% by volume. With this level of nitrogen in the shielding gas mixture, the thermal expansion mismatch between the 312 stainless steel weld overlay and the carbon steel or low alloy steel substrate is essentially eliminated when heated from room temperature to 800° F. Many boilers and vessels operate at about 800° F. with operating temperatures cycling from room temperature to 800° F.

The combined teachings of prior art do not suggest a solution to weld solidification cracking problem when applying weld overlay of 312 stainless steel or similar high chromium low nickel stainless steels which exhibit mainly ferritic microstructure. It is thus an object of this invention to provide a weld overlay process that eliminates weld solidification cracking in the weld overlay of 312 stainless steel. The prior art also does not suggest a solution for minimizing or eliminating the thermal expansion mismatch between the 312 stainless steel weld overlay and the carbon steel or low alloy steel substrate. It is another object of this invention to minimize or eliminate the thermal expansion mismatch between the 312 weld overlay and the carbon steel or low alloy steel substrate, thus significantly improving the performance capability of the weld overlaid component.

SUMMARY OF THE INVENTION

The objects stated above are obtained by the use of a specialty shielding gas mixture consisting of inert gas, argon, and nitrogen for applying weld metal overlay of 312 stainless steel using GMAW process. Although the exact mechanism is not well understood, it is believed that nitrogen gas in the shielding gas mixture was absorbed in the weld pool during welding and is responsible for the elimination of the weld solidification cracking. Type 312 stainless steel in a weld metal deposit consists of mainly ferrite (80–90% by volume) with only small amount of austenite. It appears that the nitrogen gas in the shielding gas mixture introduces nitrogen into the weld metal pool, thus resulting in changes in the microstructure and properties of the weld metal when the weld metal pool solidifies. As a result, the weld metal's resistance to solidification cracking is significantly improved. Nitrogen introduced into the 312 stainless steel weld metal from the shielding gas mixture apparently increases the weld metal's thermal expansion coefficient, thus significantly minimizing or eliminating the thermal expansion mismatch between the overlay and the substrate steel.

Table 1 shows the composition of 312 stainless steel filler metal. Other similar high chromium, low nickel stainless steels having mostly ferrite in the microstructure may also benefit from this invention, and their compositions are also shown in Table 1.

TABLE 1

Alloys Benefitted by This Invention
Chemical Compositions, in Weight Percent

| Element | 312 Stainless Steel | Similar High Chromium | Low Nickel Stainless Steels |
|---|---|---|---|
| Cr | 28.0–32.0 | 25.0–28.0 | 32.0–35.0 |
| Ni | 8.0–10.5 | 2.5–10.5 | 5.0–15.0 |
| Si | up to 1.5 | up to 1.5 | up to 1.5 |
| Mn | up to 2.5 | up to 2.5 | up to 2.5 |
| Mo | up to 1.0 | up to 1.0 | up to 1.0 |
| C | up to 0.15 | up to 0.15 | up to 0.15 |
| Fe | Balance | Balance | Balance |

It is understood that the effective gas in the mixture is nitrogen. Argon is the preferred inert gas. For the purpose of this invention, any other inert gas, such as helium, or combination of different inert gases, may be substituted as an equivalent of argon. Other gases such as $O_2$, $CO_2$, etc., may also be present for the purpose, known in the prior art, of stabilizing the arc.

BRIEF DESCRIPTION OF THE DRAWINGS

FIG. 1(a) Shows the microstructure of a 312 stainless steel weld overlay applied by a prior art method using a shielding gas of Ar-2% $O_2$, showing weld solidification cracking (100X power).

FIG. 1(b) Shows the microstructure of a 312 stainless steel weld overlay using the present invention of a shielding gas of Ar-5% $N_2$, showing no weld solidification cracking (100X power).

FIG. 2 Shows that the mean coefficient of thermal expansion from room temperature to 800° F. for the 312 stainless steel weld overlays as a function of nitrogen content (by volume percent) in Ar as a shielding gas mixture. Also indicated are the means coefficients of thermal expansion for carbon steel and several low alloy steels (i.e., ½Cr-½Mo, 1Cr-½Mo and 2¼Cr-½Mo steels).

DESCRIPTION OF THE PREFERRED EMBODIMENT

A series of weld overlay samples was prepared by depositing multipasses (three layers) of 312 stainless steel overlay metal on carbon steel plate using GMAW process with shielding gas mixtures of 100% Ar (argon), Ar-2% $O_2$, Ar-2% $N_2$, Ar-5% $N_2$, Ar-10% $N_2$, Ar-15% $N_2$, and Ar-20% $N_2$ (by volume percent). Metallographic examination was conducted on the cross sections of the overlay samples. The examination included the full section of the weld overlay, fusion line (i.e., the interface between the overlay and the substrate steel) and the substrate steel in order to check for cracks and microfissures. It was found that cracking was developed when shielding gases of 100% Ar, Ar-2% $O_2$ and Ar-2% $N_2$ were used. Cracking was eliminated when shielding gas mixtures containing nitrogen of 5% and more were used. The results are summarized in Table 2. FIG. 1(a) shows solidification cracking in the 312 stainless steel weld overlay applied by a prior art with a shielding gas of Ar-2% $O_2$, while FIG. 1(b) shows the microstructure revealing no solidification cracking using the present invention of a specialty shielding gas mixture containing nitrogen more than 2% by volume.

TABLE 2

Test Results of 312 Stainless Steel Multipass (Three Layers) Weld Metal Produced by GMAW Process with Different Shielding Gas Mixtures

| Shielding Gas | Cracking | Room Temperature Tensile Elongation (% El) | Nitrogen in Weld Metal (by Weight %) |
|---|---|---|---|
| 100% Ar | Yes | 8 | 0.038 |
| Ar-2% $O_2$ | Yes | — | 0.030 |
| Ar-2% $N_2$ | Yes | 12 | 0.084 |
| Ar-5% $N_2$ | No | 21 | 0.113 |
| Ar-10% $N_2$ | No | 27 | 0.220 |
| Ar-15% $N_2$ | No | 25 | 0.159 |
| Ar-20% $N_2$ | No | 25 | 0.168 |

Tensile specimens were obtained from all-weld-metal of the weld overlay samples, and were tested at room temperature to determine the tensile elongation. It was surprisingly found that the room temperature tensile elongation was improved with increasing nitrogen content in the shielding gas mixture. In other words, nitrogen in the shielding gas mixture, somehow, altered the mechanical properties of the weld metal, making it much more ductile, thus probably improving the weld metal's resistance to solidification cracking. Analysis of nitrogen content in weld metal samples showed that the nitrogen content in the weld metal increases with increasing nitrogen content in the shielding gas mixture. Increasing nitrogen in the shielding gas mixture more than 10% by volume did not seem to increase the nitrogen content in the weld metal further. The addition of nitrogen in the weld metal significantly improves the ductility of the weld metal. These results are also summarized in Table 2.

It was also unexpectedly discovered that the use of nitrogen-containing shielding gas mixture resulted in an increase in the thermal expansion coefficient of the 312 stainless steel weld metal. Increasing the nitrogen content of the shielding gas mixture increases the weld metal's coefficient of thermal expansion. This increase in the thermal expansion coefficient of the 312 stainless steel weld overlay minimizes or eliminates the thermal expansion mismatch between the 312 weld metal and the substrate carbon steel or low alloy steel. Minimizing or eliminating this thermal expansion mismatch between the weld overlay and the substrate steel would minimize thermal stresses arising from this thermal expansion mismatch during services. It was discovered that the optimum nitrogen in the shielding gas mixture was about 10% by volume. The coefficient of thermal expansion of the 312 weld metal was essentially in the range of carbon steel and low alloy steels, commonly used substrate materials for weld overlay. This would significantly improve the performance of the 312 weld metal overlay by eliminating or significantly minimizing the thermal stresses that may, otherwise, be generated if the special shielding gas mixture of this invention is not used. The effect of the nitrogen content in the shielding gas mixture on the thermal expansion coefficient of the 312 weld metal for the temperature range from room temperature to 800° F. for example is summarized in FIG. 2. Many boiler tubes and processing vessels operate at 800° F. Other temperature ranges also show the similar effect.

The above series of tests were performed on weld metal overlay samples produced by multipasses (three layers) of overlay metal. These multipass weld overlays are expected to be more conducive to promote cracking because of higher residual stresses. It would appear that for a weld overlay involving only a single pass (layer) of weld metal, the residual stresses generated in the weld metal are expected to be lower, thus the critical level of nitrogen in the shielding gas mixture would be expected to be lower than that observed for multipass weld overlays. It is likely that the critical nitrogen content in the shielding gas mixture may be less than 2% by volume for a single pass weld overlay. By the same token, the critical nitrogen content in the weld metal for a single pass weld overlay is likely to be less than 0.084% by weight.

While this invention is set forth with respect to some special welding procedures involving weld overlay with GMAW process, it should be understood that modifications may be made thereto without departing from the spirit and scope thereof.

What is claimed is:

1. A method for applying a stainless weld overlay on a substrate made of one of carbon steel and a low alloy steel by an arc welding process comprising: welding a stainless steel weld overlay onto the substrate using a shielding gas mixture including greater than 2% nitrogen by volume with balance being one of an inert gas and a mixture of inert gases, wherein the nitrogen is of a sufficient concentration so as to eliminate solidification cracking in the weld overlay.

2. The method of claim 1, wherein the arc welding process may be selected from the group consisting of Gas Metal Arc Welding, Gas Tungsten Arc Welding, Shielded Metal Arc Welding, Submerged Arc Welding and Laser welding processes.

3. The method of claim 1, wherein the stainless steel weld overlay is a 312 stainless steel.

4. The method of claim 1, wherein the inert gas is argon.

5. The method of claim 1, wherein the volume of the nitrogen in the shielding gas mixture ranges from greater than 2% to about 40%.

6. The method of claim 1, wherein the volume of the nitrogen in the shielding gas mixture is preferably about 10%.

7. The method of claim 1, wherein a stainless steel filler metal, by weight, is comprised of 28.0–32.0% Cr, 8.0–10.5% Ni, and balance Fe with some impurities.

8. The method of claim 1, wherein the stainless steel is a high chromium, low nickel stainless steel producing predominately ferrite in the weld overlay, and having a chemical composition, by weight, comprised of about 25–28% Cr, 2.5–10.5% Ni and balance Fe.

9. The method of claim 1, wherein the stainless steel is a high chromium, low nickel stainless steel producing predominately ferrite in the weld overlay, and having a chemical composition, by weight, comprised of about 32–35% Cr, 5.0–15% Ni and balance Fe.

10. The method of claim 1, wherein the shielding gas mixture includes about 10% $N_2$ by volume to at least one of minimize and eliminate a thermal expansion mismatch between the weld overlay and the substrate.

11. The method of claim 1, wherein nitrogen in the weld overlay is introduced into the weld overlay during melting and production of a 312 stainless steel filler metal to achieve a nitrogen content of more than 0.04%, by weight, to substantially eliminate solidification cracking in the weld overlay.

12. The method of claim 2, wherein nitrogen in the weld overlay is introduced into the weld overlay during melting and production of a 312 stainless steel filler metal to achieve a nitrogen content of at least about 0.04%, by weight, to substantially eliminate solidification cracking in the weld overlay.

13. The process in claim 1, wherein nitrogen in the weld overlay is introduced into the weld overlay during melting and production of a 312 stainless steel filler metal to achieve a nitrogen content of about 0.2%, by weight, to at least one of significantly minimize and substantially eliminate a mismatch between thermal expansion coefficients of the 312 stainless steel filler metal and the substrate.

14. The method of claim 1, wherein nitrogen in the weld overlay is introduced into the weld overlay from a flux of a 312 stainless steel filler metal to achieve a nitrogen content of more than 0.04%, by weight, substantially to eliminate solidification cracking in the weld overlay.

15. The method of claim 1, wherein nitrogen in the weld overlay is introduced into the weld overlay from a flux of a 312 stainless steel filler metal to achieve a nitrogen content of about 0.2%, by weight, to at least one of significantly minimize and substantially eliminate a mismatch between thermal expansion coefficients of the 312 stainless steel weld overlay and the substrate.

16. The method of claim 5, wherein dissimilar metal welding involving the substrate to at least one of stainless steels and a nickel-base alloy can be performed with a 312 stainless steel filler metal having a thermal expansion coefficient that matches a thermal expansion coefficient of the substrate, using an arc welding process.

17. The method of claim 1, wherein the stainless steel is a high chromium ferritic iron-base alloy comprised of ferrite in the weld overlay and having a chemical composition comprised of about 16–35% Cr, up to 10% Al and the balance Fe by weight.

18. The method of claim 1, wherein the stainless steel is a iron-base alloy comprised of ferrite in the weld overlay and having a chemical composition comprised of up to 15% Cr, 6–20% Al and the balance Fe by weight.

19. The method of claim 1, wherein the weld overlay includes three layers.

20. A method of applying a stainless steel weld overlay on a steel substrate by an arc welding process, comprising: welding a stainless steel weld overlay onto the substrate using a shielding gas mixture having inert gas and nitrogen of a sufficient concentration so as to eliminate cracking in the stainless steel weld overlay.

21. The method of claim 20, wherein in the weld overlay is a single layer.

22. The method of claim 20, wherein the weld overlay comprises three layers, and the nitrogen concentration in the shielding gas is greater than about 2%.

23. The method of claim 20, wherein the nitrogen concentration is sufficient to substantially eliminate a mismatch between thermal expansion coefficients of the substrate and the stainless steel weld overlay.

* * * * *